United States Patent
Gojo et al.

(10) Patent No.: US 11,491,445 B2
(45) Date of Patent: Nov. 8, 2022

(54) METHOD OF REGENERATING MEMBER AND METHOD OF SEAWATER DESALINATION

(71) Applicant: ASAHI KASEI KABUSHIKI KAISHA, Tokyo (JP)

(72) Inventors: Yutaka Gojo, Tokyo (JP); Takahide Yoshida, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 19 days.

(21) Appl. No.: 16/958,952

(22) PCT Filed: Jan. 22, 2019

(86) PCT No.: PCT/JP2019/001911
§ 371 (c)(1),
(2) Date: Jun. 29, 2020

(87) PCT Pub. No.: WO2019/142945
PCT Pub. Date: Jul. 25, 2019

(65) Prior Publication Data
US 2020/0338503 A1    Oct. 29, 2020

(30) Foreign Application Priority Data

Jan. 22, 2018    (JP) .............................. JP2018-007964

(51) Int. Cl.
*B01D 65/02*    (2006.01)
*C02F 1/44*     (2006.01)
(Continued)

(52) U.S. Cl.
CPC ............. *B01D 65/02* (2013.01); *B01D 61/58* (2013.01); *C02F 1/441* (2013.01); *C02F 1/444* (2013.01);
(Continued)

(58) Field of Classification Search
CPC ............................ B01D 61/025; B01D 65/02; B01D 2321/162; B01D 2321/168; C02F 1/441; C02F 2103/08
See application file for complete search history.

(56) References Cited

U.S. PATENT DOCUMENTS 4,495,335 A    1/1985   Geist et al.
2006/0231491 A1*  10/2006  Mukhopadhyay ... B01D 61/022
                                                            210/639
(Continued)

FOREIGN PATENT DOCUMENTS

AU    2015200465    2/2015
CN    101678343     3/2010
(Continued)

OTHER PUBLICATIONS

International Search Report issued in Patent Application No. PCT/JP2019/001911, dated Apr. 23, 2019 and English translation thereof.
(Continued)

*Primary Examiner* — Bradley R Spies
(74) *Attorney, Agent, or Firm* — Greenblum & Bernstein, P.L.C.

(57) ABSTRACT

This method, for regenerating a member used in a device that treats seawater, involves a cleaning step for removing deposits from the member. In the cleaning step, a first chemical solution containing an acid other than hydroxydicarboxylic acid and a second chemical solution containing hydrogen peroxide, a heavy metal compound and hydroxydicarboxylic acid are used.

16 Claims, 4 Drawing Sheets

(51) Int. Cl.
 C02F 103/08 (2006.01)
 B01D 61/58 (2006.01)
(52) U.S. Cl.
 CPC .. *B01D 2321/162* (2013.01); *B01D 2321/168* (2013.01); *C02F 2103/08* (2013.01); *C02F 2303/16* (2013.01)

(56) References Cited

U.S. PATENT DOCUMENTS

| | | |
|---|---|---|
| 2010/0133184 A1 | 6/2010 | Gojo et al. |
| 2010/0292449 A1 | 11/2010 | Tulloch et al. |
| 2018/0015417 A1 | 1/2018 | Taura et al. |

FOREIGN PATENT DOCUMENTS

| | | |
|---|---|---|
| EP | 1652571 A1 | 5/2006 |
| JP | 63-80804 A | 4/1988 |
| JP | 2010-227869 A | 10/2010 |
| JP | 2015-123430 A | 7/2015 |
| KR | 10-1078046 B1 | 10/2011 |
| WO | 2008/120509 A1 | 10/2008 |
| WO | 2016/0135901 A1 | 9/2016 |

OTHER PUBLICATIONS

Written Opinion issued in Patent Application No. PCT/JP2019/001911, dated Apr. 23, 2019.

* cited by examiner

METHOD OF REGENERATING MEMBER AND METHOD OF SEAWATER DESALINATION

FIELD

The present invention relates to a method for regenerating a member and a seawater desalination method.

BACKGROUND

Techniques for purifying raw water such as river water, lake water, groundwater, stored water, sewage, and industrial wastewater using a microfiltration membrane, an ultrafiltration membrane, or a reverse osmosis membrane are known.

When carrying out membrane filtration of raw water, substances having a size exceeding the membrane pore size (for example, matter suspended in the raw water) are blocked by the filter used in the filtration, whereby concentration polarization occurs or caking may be generated in some cases. These become contaminants of the filter, blocking the pores of the filter, increasing the filter resistance, increasing the transmembrane pressure, and decreasing the filter flow rate. Filters in which the transmembrane pressure difference has risen to a predetermined value are reused after removing the contaminants by cleaning, restoring the filter flow rate to its initial value.

Patent Literature 1 relates to a cleaning agent for cleaning such a filter, and proposes a cleaning agent for separation membranes comprising a hydroxy dicarboxylic acid, hydrogen peroxide, and a heavy metal compound.

It is considered that the cleaning agent for cleaning a filter used in the purification of raw water can be used for cleaning members used in devices for treating raw water, such as plumbing, strainers, valves, or pumps.

CITATION LIST

Patent Literature

[PTL 1] WO 2008/120509

SUMMARY

Technical Problem

Seawater desalination devices for filtering seawater and subsequently carrying out a reverse osmosis treatment to desalinate the seawater are known as devices for treating seawater. The present inventors have discovered that when the cleaning agent of Patent Literature 1 is applied to the regeneration of the member (in particular the filter) used in a device for the treatment of seawater represented by such a seawater desalination device, for example, when regeneration is carried out in an aspect in which the cleaning agent is recovered and reused, though an excellent cleaning effect is exhibited at the start of cleaning, cleaning efficiency decreases sharply thereafter.

The object of the present invention is to prevent such problems and to provide a method in which regeneration of a member used in a device for treating seawater can be carried out stably for long periods of time. In this method, it is desirable that the cleaning effect does not decrease with time, even when the cleaning agent is recovered and reused.

Another object of the present invention is to provide a seawater desalination method comprising a step for the regeneration of a member which can stably operate for long periods of time.

Solution to Problem

The cleaning agent of Patent Literature 1 comprises a hydroxy dicarboxylic acid, hydrogen peroxide, and a heavy metal compound. This cleaning agent is reported to clean and remove both organic matter and inorganic matter adhered to a filter used for the purification of raw water. In Patent Literature 1, the mode of operation of this cleaning agent is explained as follows.

In this cleaning agent, the hydroxy radical (HO.) generated by the reaction of hydrogen peroxide and a heavy metal ion derived from the heavy metal compound oxidatively decomposes and removes organic matter from the filter deposits. However, with this alone, the cleaning and removal effect on inorganic matter is insufficient, and the heavy metals used for the cleaning of the organic matter adhere to the filter surface.

By incorporating a hydroxy dicarboxylic acid with hydrogen peroxide and the heavy metal compound in the cleaning agent, it is possible to clean and remove inorganic matter from the filter deposits, as well as to remove heavy metals adhered to the filter.

However, the present inventors have discovered that when applying the cleaning agent described in Patent Literature 1 to the regeneration of a member used in a device for treating seawater and carrying out regeneration in an aspect in which, for example, the cleaning agent is recovered and reused, although the cleaning effect is high at the start of cleaning, the cleaning effect decreases sharply thereafter.

Further, the present inventors have determined that in the cleaning agent of Patent Document 1, the deposits on the member used in the device for treating seawater contain alkali metals contained in seawater and alkaline inorganic matter derived from alkaline earth metals, and due to the influence of these alkaline inorganic substances, the pH of the cleaning agent increases sharply as cleaning progresses, thereby impairing the cleaning effect of the cleaning agent.

The present inventors have achieved the present invention as a result of rigorous investigation on methods for preventing such problems.

The above objects can be achieved by the following present inventions.

<<Aspect 1>>

A method for regenerating a member used in a device for treating seawater, the method comprising:

a cleaning step for removing a deposit from the member, wherein in the cleaning step:

a first liquid chemical comprising an acid other than a hydroxy dicarboxylic acid, and a second liquid chemical comprising hydrogen peroxide, a heavy metal compound, and a hydroxy dicarboxylic acid are used.

<<Aspect 2>>

The method for regenerating a member according to aspect 1, wherein the device for treating seawater is a seawater desalination device for filtering seawater and subsequently desalinating the seawater with a reverse osmosis treatment.

<<Aspect 3>>

The method for regenerating a member according to aspect 1 or 2, wherein the member is a filter.

<<Aspect 4>>

The method for regenerating a member according to aspect 1, wherein the device for treating seawater is a seawater desalination device for filtering seawater and subsequently desalinating the seawater with a reverse osmosis treatment, the member is a filter, and the filter is one or more selected from the group consisting of a microfiltration membrane and ultrafiltration membrane used in the filtration of seawater, and a reverse osmosis membrane used in the reverse osmosis treatment of the filtered seawater.

<<Aspect 5>>

The method for regenerating a member according to any one of aspects 1 to 4, wherein the acid other than a hydroxy dicarboxylic acid in the first liquid chemical is one or more selected from hydrochloric acid, nitric acid, sulfuric acid, citric acid, oxalic acid, ascorbic acid, and ethylenediaminetetraacetic acid.

<<Aspect 6>>

The method for regenerating a member according to aspect 3 or 4, wherein the deposit removed from the filter by the cleaning step comprises:

inorganic matter which is a compound including one or more metal ions selected from calcium, magnesium, sodium, potassium, and strontium, and organic matter.

<<Aspect 7>

The method for regenerating a member according to aspect 6, wherein the deposit comprises a calcium salt.

<<Aspect 8>>

The method for regenerating a member according to any one of aspects 1 to 7, wherein in the cleaning step, the second liquid chemical contacted with the deposit becomes an alkaline used second liquid chemical, the first liquid chemical is added to the used second liquid chemical to form an acidic regenerated second liquid chemical, and the regenerated second liquid chemical is used as the second liquid chemical in the cleaning step.

<<Aspect 9>>

The method for regenerating a member according to aspect 3 or 4, wherein the cleaning step comprises:

a pH adjusting step for adding the first liquid chemical to the second liquid chemical to adjust the pH of the second liquid chemical to 6.0 or less, and a deposit removal step for removing the deposit from the filter with the second liquid chemical having a pH adjusted to 6.0 or less.

<<Aspect 10>>

The method for regeneration of a member according to aspect 9, wherein the deposit removed from the filter by the cleaning step comprises:

inorganic matter which is a compound including one or more metal ions selected from calcium, magnesium, sodium, potassium, and strontium, and organic matter.

<<Aspect 11>>

The method for regenerating a member according to aspect 10, wherein the deposit comprises a calcium salt.

<<Aspect 12>>

The method for regenerating a member according to any one of aspects 9 to 11, wherein in the deposit removal step, the second liquid chemical contacted, with the deposit becomes an alkaline used second liquid chemical, in the pH adjusting step, the first liquid chemical is added to the used second liquid chemical to form an acidic regenerated second liquid chemical, and the regenerated second liquid chemical is used as the second liquid chemical in the deposit removal step.

<<Aspect 13>>

The method for regenerating a member according to aspect 3 or 4, wherein the cleaning step comprises:

a first cleaning step for cleaning the filter with the first liquid chemical, and a second cleaning step for further cleaning a filter after the first cleaning step with the second liquid chemical.

<<Aspect 14>>

The method for regenerating a member according to aspect 13, wherein the deposit removed from the filter in the first cleaning step comprises inorganic matter which is a compound including one or more metal ions selected from calcium, magnesium, sodium, potassium, and strontium.

<<Aspect 15>>

The method for regenerating a member according to aspect 14, wherein the deposit comprises a calcium salt.

<<Aspect 16>>

The method for regenerating a member according to any one of aspects 13 to 15, wherein the deposit removed from the filter in the second cleaning step comprises organic matter.

<<Aspect 17>>

The method for regenerating a member according to any one of aspects 1 to 16, wherein the second liquid chemical is recovered and reused.

<<Aspect 18>>

The method for regenerating a member according to aspect 1 or 2, wherein the member is a member comprising a conduit.

<<Aspect 19>>

The method for regenerating a member according to aspect 18, wherein the member is plumbing, a strainer, a valve, or a pump.

<<Aspect 20>>

A method for desalinating seawater, comprising:

a seawater desalination step for filtering seawater and subsequently desalinating the seawater by a reverse osmosis treatment, and a cleaning step for removing a deposit from a member used in the seawater desalination step, wherein in the cleaning step:

a first liquid chemical comprising an acid other than a hydroxy dicarboxylic acid, and a second liquid chemical comprising hydrogen peroxide, a heavy metal compound, and a hydroxy dicarboxylic acid are used.

Advantageous Effects of Invention

According to the present invention, a method for the regeneration of a member used in a device for treating seawater which can be stably carried out for long periods of time and a seawater desalination method comprising a step for the regeneration of a member which can operate stably for long periods of time are provided. In the member regeneration method and seawater desalination method provided by the present invention, the extent to which the cleaning effect decreases over time is extremely small, even in the case in which a cleaning liquid for regeneration of a member used in a device for treating seawater is recovered and reused (e.g., in circulating filtration cleaning).

The member regeneration method of the present invention can be suitably applied particularly to the regeneration of filters used for the desalination of seawater.

DESCRIPTION OF EMBODIMENTS

<<Member Regeneration Method>>

Figure 1:
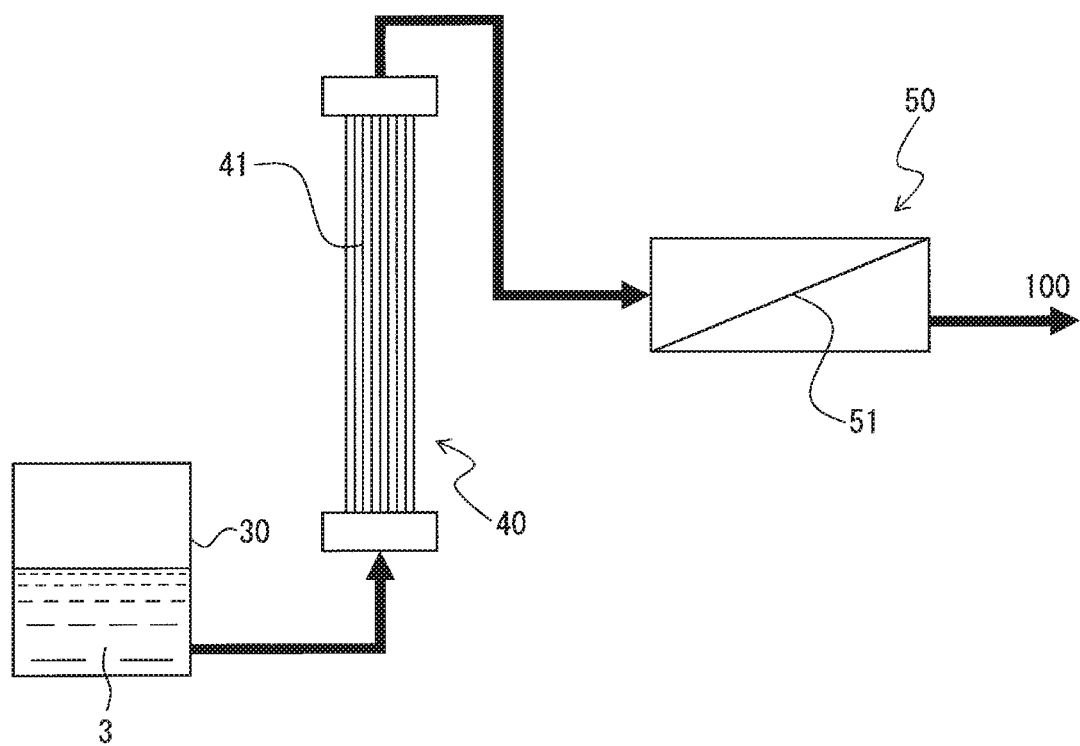
FIG. 1 is a schematic view of an example of a seawater desalination process used in the member regeneration method of the present invention.

The method for regenerating a member of the present invention is:

a method for regenerating a member used in a device for treating seawater, the method comprising:

a cleaning step for removing a deposit from the member, wherein in the cleaning step:

a first liquid chemical comprising an acid other than a hydroxy dicarboxylic acid, and a second liquid chemical comprising hydrogen peroxide, a heavy metal compound, and a hydroxy dicarboxylic acid are used.

Examples of the device for treating seawater used in the method of the present invention include seawater processing devices and seawater transporting devices. Examples of seawater processing devices include devices for purifying seawater, specifically, seawater desalination devices for desalinating by filtering seawater and subsequently carrying out a reverse osmosis treatment on the seawater. Examples of the member used in the method of the present invention include filters used in devices for treating seawater and members having conduits. Specific examples of members having conduits include plumbing, strainers, valves, and pumps.

The present invention will be described in detail below using a method for regenerating a filter used in a seawater desalination device for filtering seawater and subsequently carrying out a reverse osmosis treatment on the seawater as an example. However, the present invention is not limited to this case.

For example, the seawater desalination device should be understood to encompass general seawater treatment devices. The filter used for the seawater desalination device should be understood to encompass general members used in seawater treatment devices.

The scope of the invention is defined by the attached claims.

<Filter Regeneration Method>

More specifically, the filter regeneration method of the present invention may be, for example:

a, filter regeneration method (first regeneration method), wherein the cleaning step in the filter regeneration method comprises:

a pH adjusting step for adding the first liquid chemical to the second liquid chemical to adjust the pH of the second liquid chemical to 6.0 or less, and a deposit removal step for removing the deposit from the filter with the second liquid chemical having a pH adjusted to 6.0 or less, or a filter regeneration method (second regeneration method), wherein the cleaning step in the filter regeneration method comprises:

a first cleaning step for cleaning the filter with the first liquid chemical, and a second cleaning step for further cleaning a filter after the first cleaning step with the second liquid chemical.

Below, the first liquid chemical and second liquid chemical used in the filter regeneration method of the present invention, the filter to which the method of the present invention is applied, and the first regeneration method and second regeneration method for regenerating the filter will be described in this order.

<First Liquid Chemical>

The first liquid chemical used in the filter regeneration method of the present embodiment includes an acid other than a hydroxy dicarboxylic acid, and is preferably a solution further including a solvent, more preferably an aqueous solution including water as the solvent.

[Acid Other than a Hydroxy Dicarboxylic Acid]

Examples of the acid other than a hydroxy dicarboxylic acid included in the first liquid chemical include inorganic acids and organic acids other than a hydroxy dicarboxylic acid.

The inorganic acid is preferably a strong acid having a negative acid dissociation constant pKa. Specific examples thereof include hydrochloric acid, nitric acid, and sulfuric acid. One or more from among these can be used.

The organic acid other than a hydroxy dicarboxylic acid is preferably a polybasic acid other than a hydroxy dicarboxylic acid, and is more preferably one or more selected from polyvalent carboxylic acids other than a hydroxy dicarboxylic acid and ascorbic acid. Specific examples thereof include citric acid, oxalic acid, ascorbic acid, ethylenediaminetetraacetic acid (EDTA), diethylenetriaminepentaacetic acid (DTPA), hydroxyethylethylenediamine triacetic acid (HEDTA), triethylenetetramine hexacetic acid (TTHA), and nitrilo triacetic acid (NTA). One or more from among these can be used.

Among these acids, citric acid, oxalic acid, or EDTA is preferably used as the organic acid other than a hydroxy dicarboxylic acid.

The acid other than a hydroxy dicarboxylic acid included in the first liquid chemical is preferably an inorganic acid, and is particularly preferably hydrochloric acid.

[Optional Components]

Though the first liquid chemic includes an acid other than a hydroxy dicarboxylic acid, and preferably further includes a solvent, optional components other than these components may be included therein.

Examples of the optional components which can be included in the first liquid chemical include surfactants, chelating agents, pH adjusting agents, thickeners, antifoaming agents, and preservatives. The surfactants and chelating agents are the same as those described below as optional components of the second liquid chemical.

[pH]

In order to achieve an effective cleaning effect or pH adjusting effect, the first liquid chemical preferably has a pH adjusted to the acid region, and more preferably, may have a pH of 5 or less, 4 or less, or 3 or less.

If the acidity of the first liquid chemical is excessively high, corrosion of the device becomes problematic. Thus, it is preferable that the pH of the first liquid chemical be 0 or more, and 0.1 or more, or 0.2 or more.

<Second Liquid Chemical>

The second liquid chemical used in the filter regeneration method of the present embodiment includes hydrogen peroxide, a heavy metal compound, and a hydroxy dicarboxylic acid, and is preferably a solution further including a solvent, more preferably an aqueous solution including water as the solvent.

[Hydrogen Peroxide]

The second liquid chemical includes hydrogen peroxide.

The concentration of the hydrogen peroxide in the second liquid chemical is preferably in the range of 0.001 mol/L to 10 mol/L. When the concentration of hydrogen peroxide is less than 0.001 mol/L, the hydrogen peroxide may be consumed before deposit removal is complete and the cleaning effect may be insufficient. When the concentration of hydrogen peroxide exceeds 10 mol/L, though there are no problems from the viewpoint of the cleaning effect, a large amount of hydrogen peroxide remains in the used second liquid chemical after cleaning. As a result, in some cases, a drainage process using a large amount of reducing agent is necessary.

The concentration of hydrogen peroxide in the second liquid chemical is more preferably in the range of 0.1 mol/L to 3 mol/L.

When preparing the second liquid chemical, the hydrogen peroxide may be mixed in the form of hydrogen peroxide, or may be mixed in the form of a compound that generates hydrogen peroxide in the solution after mixing. Examples of compounds which generate hydrogen peroxide in the solution include sodium percarbonate and sodium perborate.

[Heavy Metal Compound]

The second liquid chemical includes a heavy metal compound.

The heavy metal compound is a compound comprising a heavy metal atom selected from iron, manganese, cobalt, nickel, titanium, and copper, and is preferably one or more selected from a chloride, a sulfide, and an oxide. Ferrous chloride ($FeCl_2$) is a particularly preferable heavy metal compound. Ferrous chloride is preferable because it is inexpensive and precipitates upon the addition of an alkali (for example, sodium hydroxide) to the cleaning solution after use and can be easily removed by filtration.

The concentration of the heavy metal compound in the second liquid chemical is preferably 0.0001 mol/L to 0.0050 mol/L. When the concentration of the heavy metal compound is less than 0.0001 mol/L, in some case, the organic matter cleaning removal effect may be insufficient. When the concentration of the heavy metal compound is raised above 0.0050 mol/L, insoluble matter is generated in the second liquid chemical, and there is a risk that the insoluble matter will adhere to the filter and cause contamination.

The concentration of the heavy metal compound in the second liquid chemical is more preferably 0.0002 mol/L to 0.0030 mol/L, further preferably 0.0003 mol/L to 0.0010 mol/L.

[Hydroxy Dicarboxylic Acid]

The second liquid chemical includes a hydroxy dicarboxylic acid.

Examples of the hydroxy dicarboxylic acid include malic acid, tartaric acid, tartronic acid (i.e., 2-hydroxymalonic acid), citramalic acid (i.e., 2-methyl malic acid), dioxymaleic acid, and dioxymalonic acid. One or more selected from these can be used.

The amount of the hydroxy dicarboxylic acid in the second liquid chemical is preferably 0.01 to 10,000-fold the amount of the heavy metal compound by mol. When the amount of the hydroxy dicarboxylic acid in the second liquid chemical is less than 0.1-fold the amount of the heavy metal compound by mol, there is risk that heavy metals will precipitate during filter cleaning. Conversely, when the amount of the hydroxy dicarboxylic acid in the second liquid chemical exceeds 10,000-fold the amount of the heavy metal compound by mol, there is a risk that the hydroxy dicarboxylic acid itself may be oxidatively decomposed, whereby the decomposition removal performance of organic matter in filter deposits may be impaired.

The amount of the hydroxy dicarboxylic acid in the second liquid chemical is preferably 0.0001 to 100-fold the amount of the hydrogen peroxide by mol. When the amount of the hydroxy dicarboxylic acid in the second liquid chemical is less than 0.0001-fold the amount of the hydrogen peroxide by mol, in some cases, the inorganic matter clean removal effect in the filter deposits may be insufficient. When the amount of the hydroxy dicarboxylic acid in the second liquid chemical exceeds 100-fold the amount of hydrogen peroxide by mol, the pH of the second liquid chemical is excessively low, for example, when the heavy metal compound is an iron compound, in some cases, the cleaning effect by Fenton's reaction may be impaired.

[Optional Components]

The second liquid chemical includes hydrogen peroxide, a heavy metal compound, and a hydroxy dicarboxylic acid, and preferably further includes a solvent and may include optional components other than these.

Examples of optional components which can be included in the second liquid chemical include surfactants, chelating agents, pH adjusting agents, thickeners, antifoaming agents, and preservatives.

[Surfactants]

Examples of surfactants which can optionally be included in the second liquid chemical include anionic surfactants, cationic surfactants, amphoteric surfactants, and nonionic surfactants. One or more of these can be used.

Examples of anionic surfactants include soaps, sulfuric acid esters of higher alcohols, alkylbenzenesulfonic acid, alkylnaphthalenesulfonic acid, and phosphoric acid esters of higher alcohols.

Examples of cationic surfactants include primary amine salts, secondary amine salts, tertiary amine salts, and quaternary ammonium salts.

Examples of amphoteric surfactants include alkyl dimethyl amine oxide, alkyl dimethyl amino fatty acid betaine, and alkyl carboxymethyl hydroxyethyl imidazolium betaine.

Examples of nonionic surfactants include polyoxyethylene alkyl phenyl ether, polyoxypropylene alkyl phenyl ether, polyoxyethylene alkyl ether, polyoxyethylene alkyl ester, polyethylene glycol alkyl ester, ethylene oxide adducts of polypropylene glycol, and propylene oxide adducts of polypropylene glycol.

(Chelating Agent)

Examples of chelating agents which can be optionally included in the second liquid chemical include 1-hydroxyethylidene-1,1-diphosphonic acid, aminotrimethylene phosphonic acid, ethylenediaminetetramethylene phosphonic acid, hexamethylenediamine tetramethylene phosphonic acid, diethylenetriaminepentamethylene phosphonic acid, and sodium salts, potassium salts, lithium salts, ammonium salts, amine salts, and alkanolamine salts thereof.

[pH]

The pH of the second liquid chemical is preferably in the acid region in order to maintain a high clean removal effect of filter deposits, in particular, inorganic matter. The pH of the second liquid chemical is preferably 6.0 or less, more preferably 2.0 to 5.0, further preferably 2.0 to 4.0, and in particular, may be 2.0 to 3.0, 2.0 to 2.5, or 2.2 to 2.4. The pH may typically be 2.3.

[Preparation of the Second Liquid Chemical]

The second liquid chemical can be prepared by mixing the predetermined components in a solvent. Though the order of mixing of each ingredient into the solvent is arbitrary, from the viewpoint of preventing the heavy metal compound from adhering to the wall surface of the mixing container during preparation of the second liquid chemical, initially dissolving the heavy metal compound sufficiently in the solvent and thereafter mixing the other components is preferable.

<Filter Used in the Seawater Desalination Device>

The filter regeneration method of the present invention is suitably used for the regeneration of a filter used in a seawater desalination device for desalination by filtering seawater and subsequently carrying out a reverse osmosis treatment on the seawater.

Various types of inorganic matter and organic matter are contained in seawater. Since seawater differs from river water particularly in that it contains a large amount of salt, special consideration is required for the regeneration of the filters used in seawater desalination devices.

FIG. 1 is a schematic view showing an example of a seawater desalination step using a filter which can be suitably used in the filter regeneration method of the present invention.

The seawater desalination process of FIG. 1 includes a seawater tank (30), a filtration unit (40) and a reverse osmosis unit (50). A sedimentation tank or centrifugal separator for removing insoluble matter, or another filtration unit for removing solute having a relatively large diameter may be provided between the seawater tank (30) and the filtration unit (40).

In FIG. 1, plumbing for connecting each tank and unit is also provided. However, valves for opening and closing the flow paths in the plumbing, pumps for pumping liquid, and compressors for pressurizing the liquid are not shown.

After removing insoluble matter from the seawater (3) in the seawater tank (30) as necessary, the seawater flows to the filtration unit (40) and is filtered by a microfiltration membrane or an ultrafiltration membrane (41) to remove solute larger than the pore size of the filter. The substances to be removed before the seawater passes through the filtration unit (40) include, for example, algae, sediment, bacteria, and viruses.

In the process of FIG. 1, the filtration unit (40) is in the form of a hollow fiber membrane module. However, the filtration unit (40) is not limited thereto.

When the filtration unit (40) is a hollow fiber membrane module, the hollow fiber membrane module may be an "internal pressure-type" module for filtering by introducing raw water (seawater) into the hollow portion of the hollow fibers and passing the seawater through the outer wall of the hollow fibers to the outside of the hollow fibers, or may be an "external pressure-type" module for filtering by introducing raw water to the outside of the hollow fibers and passing the raw water through the outer wall of the hollow fibers to the inner hollow portion of the hollow fibers. In the case of an external pressure-type module, the plumbing for the introduction of raw water may be a side tube of the module, and the raw water introduced from an inner pipe coaxial with the longitudinal direction of the module may be sent to the outside of the hollow fiber through a water passage hole provided in a potting part (sealing part).

A filtration unit comprising an external-pressure-type module in which raw water introduced from an inner pipe coaxial with the longitudinal direction of the module flows to the outside of the hollow fiber through a water passage hole provided in the potting part will be described below as an example. However, the present invention is not limited thereto (the same is true for FIGS. 2 and 3).

In the process of FIG. 1, seawater (3) is introduced to the lower inner pipe of the filtration unit (40), flows to the outside of the hollow fibers through a water passage hole provided, for example, in the potting part, further passes through the outer wall of the hollow fiber part to the inner hollow portion of the hollow fibers, and is discharged from the upper inner pipe of the filtration unit (40).

The seawater after passing through the filtration unit (40) then flows to the reverse osmosis unit (50), and is further filtered by the reverse osmosis membrane (51) to obtain freshwater (100). The material removed by the reverse osmosis unit (50) includes, for example, minor components such as salt and boron.

In addition to the aforementioned material, alkaline inorganic matter, which is compounds including alkali metal and alkali earth metal ions, is contained in the seawater. A majority of this alkaline inorganic matter is trapped by the filtration unit (40) and the remainder passes therethrough and is trapped by the reverse osmosis unit (50).

Thus, the deposits on the filter used in the seawater desalination device include deposits derived from the aforementioned alkaline inorganic matter in addition to deposits conventionally adhering to filters at the time of purification of freshwater such as river water.

Examples of the above alkaline metals include sodium and potassium.

Examples of alkaline earth metals include calcium, magnesium, and strontium.

Ions of alkaline metals and alkaline earth metals are frequently present in the form of salts with counter anions. Examples of counter anions include fluoride ions, chloride ions, bromide ions, sulfuric acid ions, bicarbonate ions, and borate ions.

The filter regeneration method of the present invention is applied to seawater desalination devices and is effective for the regeneration of filters to which deposits derived from alkaline inorganic matter have adhered.

The filter suitably used in the method of the present invention is, more specifically, preferably one or more selected from a microfiltration membrane or ultrafiltration membrane used for the filtration of seawater and a reverse osmosis membrane used to carry out a reverse osmosis treatment after the filtration of seawater.

In particular, microfiltration membranes or ultrafiltration membranes are suitable for maximally exhibiting the advantageous effect of the present invention since large amounts of alkaline inorganic matter adhere to microfiltration membranes and ultrafiltration membranes used in the filtration of seawater.

The shape of the filter is arbitrary. For example, the filter may be a flat film-type, laminate-type, bellows-type, rolltype, or hollow fiber-type. In view of securing a large membrane area with a small volume, a hollow fiber membrane module in which a plurality of hollow fiber filters are packaged is preferable.

The filter to, which the method of the present invention is applied may be composed of any arbitrary material. For example, a filter composed of a fluorine-based resin or a polysulfone-based resin may be used.

Examples of the fluorine-based resin include polytetrafluoroethylene, polychlorotrifluoroethylene, polyvinylidene fluoride, polyvinyl fluoride, perfluoroalkoxy fluorine resins, ethylene tetrafluoride-hexafluoropropylene copolymers, ethylene-tetrafluoroethylene copolymers, and ethylene-chlorotrifluoroethylene copolymers.

Examples of polysulfone-based resins include polysulfone and polyethersulfone.

Since the second liquid chemical used in the method of the present invention has an extremely strong oxidizing power, it is desirable to apply the method of the present invention to a filter having a high oxidation resistance. Thus, the method of the present invention is preferably applied to a filter composed of a fluorine-based resin.

<First Regeneration Method>

As described above, the filter regeneration method of the present invention is:

a method for regenerating a filter used in a seawater desalination device for filtering seawater and subsequently desalinating the seawater by a reverse osmosis treatment, comprising:

a cleaning step for removing deposits from the filter, wherein in the cleaning step, the first liquid chemical and the second liquid chemical are used.

In the first regeneration method among the filter regeneration methods of the present invention, the cleaning step for removing deposits from the filter in the filter regeneration method of the present invention comprises:

a pH adjusting step for adding the first liquid chemical to the second liquid chemical to adjust the pH of the second liquid chemical to 6.0 or less, and a deposit removal step for removing deposits from the filter with the second liquid chemical having a pH adjusted to 6.0 or less.

The second liquid chemical exhibits an extremely high clean removal effect against deposits including organic matter and inorganic matter. However, when a filter is cleaned with the second liquid chemical, it is thought that the inorganic matter contained in the deposits of the filter reacts with the second liquid chemical to generate a solvent-soluble alkaline chemical species. Thus, the pH of the reaction field where the filter and the second liquid chemical are in contact is raised to alkaline by the generated alkaline chemical species, and the cleaning power decreases over time. Since the second liquid chemical recovered from such a reaction field also exhibits alkalinity, if it is reused as-is for cleaning, the desired cleaning effect cannot be obtained.

In the first regeneration method, a pH adjusting step is carried out in which the first liquid chemical is added to the alkaline used second liquid chemical, which was recovered after use in cleaning, to obtain an acidic regenerated second liquid having a pH adjusted to an appropriate value. The cleaning power of the second liquid chemical is maintained by using the obtained regenerated second liquid chemical as the second liquid chemical in the deposit removal step.

Thus, the first regeneration method can maximally exhibit the desired effect when recovering and reusing the second liquid chemical and is suitable for, for example, circulating filtration cleaning.

In the pH adjusting step of the first regeneration method, it is necessary that the pH of the second liquid chemical be adjusted to 6.0 or less. It is preferable that the pH of the second liquid chemical be adjusted to the range of 2.0 to 5.0, more preferably the range of 2.0 to 4.0, and particularly preferably 2.0 to 3.0, 2.0 to 2.5, or 2.2 to 2.4. Typically, the pH of the second liquid chemical is adjusted to 2.3.

The addition of the first liquid chemical to the second liquid chemical may be carried out continuously or intermittently while, for example, monitoring the pH of the second solution.

In the deposit removal step of the first regeneration method, the second liquid chemical having an adjusted pH (the regenerated second liquid chemical) is contacted with the filter to clean and remove deposits on the filter.

The method for contacting the second liquid chemical with the filter may be filtration cleaning in which the second liquid chemical is passed through the filter in the membrane thickness direction or may be surface cleaning in which the second solution is flowed in a direction along the surface of the filter. When the second liquid chemical is passed through the filter in the membrane thickness direction, the passage direction may be from the raw water (seawater) side membrane surface or may be from the filtered water side membrane surface.

Immersion cleaning wherein the filter is immersed in the second liquid chemical for a predetermined duration and a cleaning method in which air bubbles are introduced simultaneously or sequentially with the second liquid chemical are also preferred aspects of the present invention.

The deposit removal step of the first regeneration method can be carried out at an arbitrary temperature or may be carried out at a temperature of 0° C. to 50° C. or 5° C. to 45° C. The typical execution temperature is ambient temperature (e.g., 5° C. to 40° C.). The execution duration of the deposit removal step may be, for example, 10 minutes to 48 hours, 20 minutes to 24 hours, or 30 minutes to 12 hours depending on the extent of deposits on the filter, the concentration of the second liquid chemical, and operating temperature.

According to the first regeneration method, among deposits attached to the filter, alkaline inorganic matter and organic matter are removed by a one-stage deposit removal step.

Additionally, the deposits removed from the filter by the deposit removal step of the first regeneration method include:

inorganic matter which is a compound including one or more metal ions selected from calcium, magnesium, sodium, potassium, and strontium, and organic matter.

The first regeneration method is preferable when the deposits removed from the filter in the deposit removal step include, in particular, calcium salts since the effect of the present invention can be maximally exhibited thereby.

<Second Regeneration Method>

In the second regeneration method among the filter regeneration methods of the present invention, the cleaning step for removing deposits from the filter in the filter regeneration method of the present invention includes:

a first cleaning step for cleaning the filter with the first liquid chemical, and a second cleaning step for further cleaning the filter with the second liquid chemical after the first cleaning step.

As described above, since the second liquid chemical after cleaning by contacting the filter one time captures the alkaline inorganic matter contained in the deposit of the filter, the pH rises, and the expected cleaning power is impaired, whereby when the second liquid chemical after cleaning is recovered and reused, the cleaning effect thereof decreases rapidly.

In order to avoid such an issue, in the second regeneration method, after cleaning with the first liquid chemical in the first cleaning step to remove alkaline inorganic matter in the deposits, by cleaning with the second liquid chemical in the second cleaning step, filter deposits can be completely removed and the second liquid chemical can be effectively recovered and reused.

Thus, in the second regeneration method, even when the second liquid chemical is recovered and reused, for example, in the case of circulating filtration cleaning, the desired effect of the present invention is effectively exhibited.

The second regeneration method is preferable because when recovering and reusing the second liquid chemical, a high level of cleaning effect is maintained for a long period without the need to carry out a pH adjusting step for adjusting the pH of the second liquid chemical after use.

In the second regeneration method, the deposits removed from the filter in the first cleaning step include inorganic matter which is compounds including one or more metal ions selected from calcium, magnesium, sodium, potassium, and strontium, and the deposits removed from the filter in the second cleaning step include organic matter.

The second regeneration method is preferable when the deposits removed from the filter in the first cleaning step include, in particular, calcium salt since the effect of the present invention can be maximally exhibited thereby.

The method by which the first liquid is contacted with the filter in the first cleaning step, the method by which the second liquid chemical is contacted with the filter in the second cleaning step, and the execution temperatures and durations of the first cleaning step and the second cleaning step are the same as those for the contact of the second liquid chemical with the filter in the first regeneration method.

<<Seawater Desalination Method>>

Another perspective of the present invention relates to a seawater desalination method using a member regeneration method as described above.

Specifically, according to this perspective, there is provided a seawater desalination method, comprising:

a seawater desalination step for filtering seawater and subsequently desalinating the seawater by a reverse osmosis treatment, and a cleaning step for removing deposits from the member used in the seawater desalination step, wherein in the cleaning step:

the first liquid chemical comprising an acid other than a hydroxy dicarboxylic acid, and a second liquid chemical comprising hydrogen peroxide, a heavy metal compound, and a hydroxy dicarboxylic acid are used.

More specifically, the seawater desalination method of the present invention may be:

a seawater desalination method (first seawater desalination method), wherein the cleaning step in the seawater desalination method comprises:

a pH adjusting step for adding the first liquid chemical to the second liquid chemical to adjust the pH of the second liquid chemical to 6.0 or less, and a deposit removal step for removing deposits from the member with the second liquid chemical having a pH adjusted to 6.0 or less, or a seawater desalination method (second seawater desalination method), wherein the first cleaning step in the seawater desalination method comprises:

a first cleaning step for cleaning the member with the first liquid chemical, and a second cleaning step for further cleaning the member with the second liquid chemical after the first cleaning step.

Preferred embodiments of the first seawater desalination method and the second seawater desalination method will be described in this order below referring to the drawings.

Below, examples of the first and second seawater desalination methods in the case in which the microfiltration membrane or ultrafiltration membrane (41) in the filtration unit (40) is cleaned in the cleaning step will be described as examples. However, the case in which the reverse osmosis membrane (51) of the reverse osmosis unit (50) is cleaned or the case in which a member other than the filter, such as plumbing, a strainer, a valve, or a pump, is cleaned may also be understood from the following description.

<First Seawater Desalination Method>

In the first seawater desalination method, the aforementioned first regeneration method can be used as the filter cleaning step.

Figure 2:
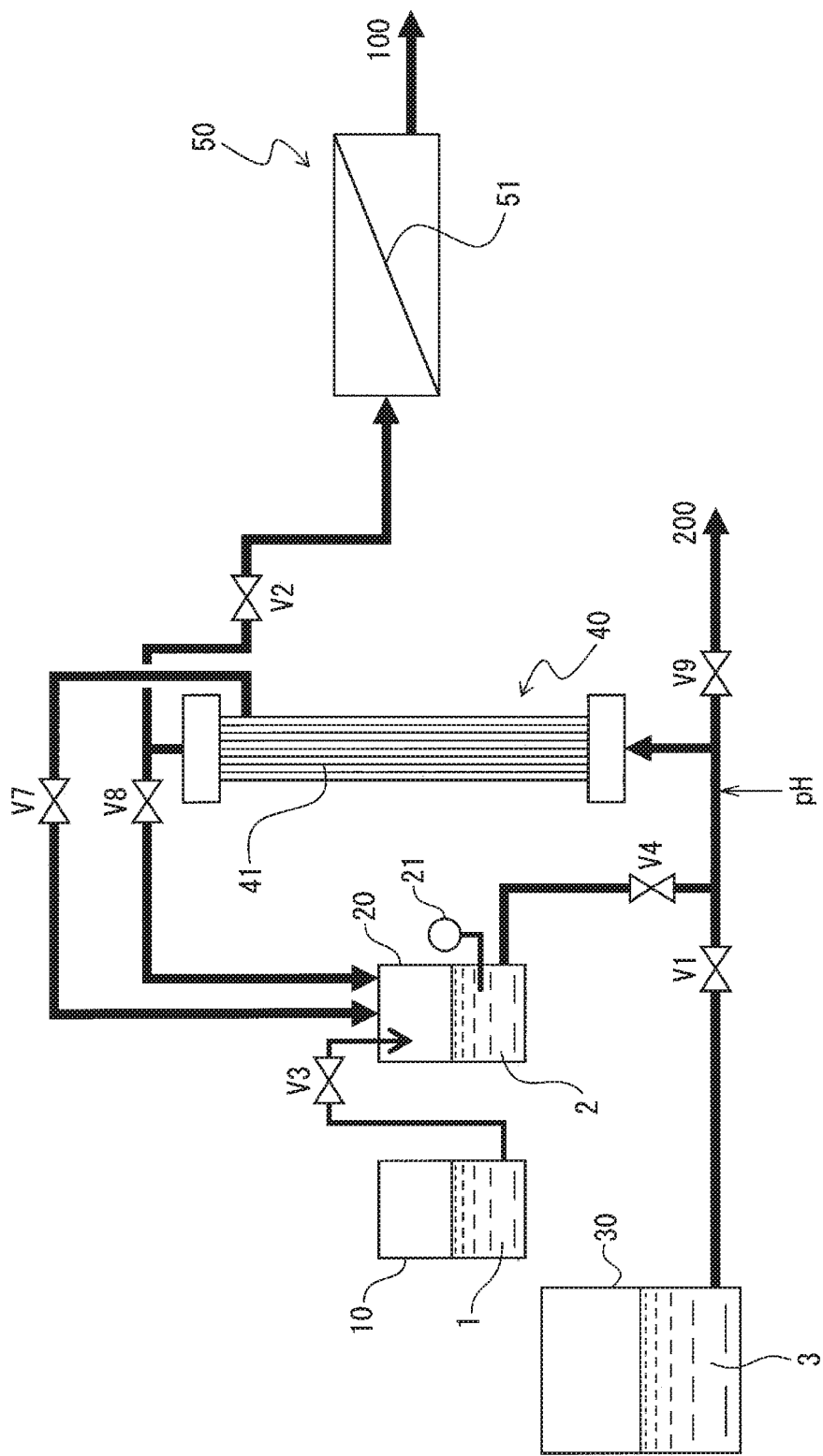
FIG. 2 is a schematic view showing an example of a process of the seawater desalination method of the present invention.

FIG. 2 is a schematic view showing an example of the step of the first seawater desalination method of the present invention.

The process of FIG. 2 includes, in addition to the seawater tank (30), filtration unit (40), and reverse osmosis unit (50) included in the seawater desalination step of FIG. 1, an additional structure including a first liquid chemical tank (10) and a second liquid chemical tank (20). Thus, like the filtration unit (40) of FIG. 1, the filtration unit (40) of FIG. 2 is an external pressure-type module having a water passage hole in the potting part thereof. However, the present invention is not limited thereto.

A pH meter (21) is provided in the second liquid chemical tank (20) for measuring the pH of the liquid therein.

In FIG. 2, plumbing for connecting the first liquid chemical tank (10) and the second liquid chemical tank (20) and valves for opening and closing the flow paths are also added in the plumbing. Pumps for sending solution, stirrers for stirring liquids, and compressors for pressurizing liquids are not shown.

In the process of FIG. 2, by opening the seawater desalination valves (V1, V2) and closing the other valves, flow paths from the seawater tank (30) to the filtration unit (40) and from the filtration unit (40) to the reverse osmosis unit (50) are opened, and the other flow paths are closed. As a result, seawater (3) stored in the seawater tank (30) flows to the filtration unit (40), is filtered by the microfiltration membrane or ultrafiltration membrane (41) in the filtration unit (40), then flows to the reverse osmosis unit (50), and undergoes reverse osmosis filtration by the reverse osmosis membrane (51) in the reverse osmosis unit (50), whereby freshwater (100) is obtained.

When such a seawater desalination processes is continued for a certain period of time, deposits adhere to the filter used in the process, for example, the microfiltration membrane or ultrafiltration membrane (41) in the filtration unit (40), which increases the transmembrane pressure difference and decreases the filtration flow rate.

When the transmembrane pressure difference reaches a predetermined value, the operation of the seawater desalination process is stopped and a cleaning process is carried out to remove the deposits from the filter.

The cleaning step in the first seawater desalination method comprises:

a pH adjusting step for adding the first liquid chemical to the second liquid chemical to adjust the pH of the second liquid chemical to 6.0 or less, and a deposit removal step for removing deposits from the filter with the second liquid chemical having a pH adjusted to 6.0 or less.

After cleaning has started, since the pH of the second liquid chemical has been appropriately adjusted to 6.0 or less, it is not necessary to carry out the pH adjusting step.

In the deposit removal step, the seawater desalination valves (V1, V2) are closed, the flow paths from the seawater tank (30) to the filtration unit (40) and from the filtration unit (40) to the reverse osmosis unit (50) are blocked, the second liquid chemical discharge side valve (V4), and at least one of the second liquid chemical side pipe return valve (V7) and the second liquid chemical inner pipe return valve (V8) are opened, whereby flow paths from the second liquid chemical tank (20) to the filtration unit (40) and from the filtration unit (40) to the second liquid chemical tank (20) are opened. As a result, the second liquid chemical (2) in the second liquid chemical tank (20) can contact the microfiltration membrane or ultrafiltration membrane (41) in the filtration unit (40). Thus, deposits on the microfiltration membrane or ultrafiltration membrane (41), including alkaline inorganic matter and organic matter, can be gradually cleaned and removed.

In the process of FIG. 2, the second liquid chemical (2) is introduced to the filtration unit (40) from the lower inner pipe of the filtration unit (40). For example, the second liquid chemical (2) passes through the water passage hole of the potting part and flows to the outside of the hollow fiber microfiltration membrane or ultrafiltration membrane (41).

When the second liquid chemical side pipe return valve (V7) is opened, the second liquid chemical (2) flows outside the hollow fibers in the longitudinal direction of the hollow fibers, passes through the side tube of the filtration unit (40), and returns to the second liquid chemical tank (20), whereby a surface cleaning circulating flow path is formed. Conversely, when the second liquid chemical inner pipe return valve (V8) is opened, the second liquid chemical (2) passes from the outside of the hollow fibers through the outer wall of the hollow fibers in the membrane thickness direction to the inner hollow portion of the hollow fiber and returns to the second liquid chemical tank (20) through the upper inner pipe of the filtration unit (40), whereby a circulating filtration cleaning flow path is formed.

The degree of opening of the second liquid chemical side pipe return valve (V7) and the second liquid chemical inner pipe return valve (V8) may be adjusted, whereby both of these circulating flow paths can be used.

The cleaning in the deposit removal step may be circulation in which the second liquid chemical (2) moves along the aforementioned circulating flow paths or may be immersion cleaning in which the second liquid chemical (2) does not move. In the case of immersion cleaning, after the filtration unit (40) is filled with the second liquid chemical (2), each of the valves which are opened during immersion cleaning to form the circulating flow path may be kept open or may be kept closed.

Since it is not necessary to carry out the pH adjusting step immediately after cleaning has started, as described above, the first liquid chemical discharge side valve (V3) may be closed.

In the cleaning step of the present invention, when the second liquid chemical (2) is continuously reused, the desired effect of the present invention can be exhibited effectively. In the present description, "continuous reuse" of the second liquid chemical (2) encompasses the case in which the second liquid chemical (2) is recovered after immersion cleaning in addition to the case of deposit removal by circulation.

In the case of carrying out the deposit removal step by circulation, it is preferable that at least one of the second liquid chemical side pipe return valve (V7) and the second liquid chemical inner pipe return valve (V8), which open and close the return flow path to the second liquid chemical tank (20), be opened. The drainage valve (V9) may be fully closed and the full amount of the second liquid chemical (2) may be circulated. Alternatively, a method in which a portion of the second liquid chemical (2) is circulated by opening the drainage valve (V9) halfway to discard a portion of the second liquid chemical (2) may be used.

When the cleaning of the microfiltration membrane or ultrafiltration membrane (41) is carried out as described above, the pH of the second liquid chemical (2) in the second liquid chemical tank (20) increases, whereby cleaning efficiency decreases. At this time, the first liquid chemical discharge side valve (V3) is opened, the first liquid chemical (1) is added to the second liquid chemical (2) in the second liquid chemical tank (20), and cleaning is continued while adjusting the pH of the second liquid chemical (2) so as not to exceed 6.0.

Confirmation of the pH of the second liquid chemical (2) can be carried out by the pH meter (21) arranged in, for example, the second liquid chemical tank (20) in the case of circulation or can be carried out by analysis of liquid chemical sampled at an appropriate time at, for example, a pH sampling position (pH) in the case of immersion cleaning.

In the first seawater desalination method of the present invention, by continuously reusing the second liquid chemical (2) while maintaining a high cleaning efficiency in this manner, the cleaning step can be stably carried out at high efficiency.

After the cleaning of the microfiltration membrane or ultrafiltration membrane (41) is stopped and the microfiltration membrane or ultrafiltration membrane (41) is rinsed as necessary, the seawater desalination valves (V1, V2) are opened and the other valves are closed, and seawater desalination may be continued.

After cleaning has been stopped for a predetermined interval, the cleaning effect may be confirmed by, for example, comparing with the initial value of the transmembrane pressure difference or the initial value of permeability performance.

<Second Seawater Desalination Method>

In the second seawater desalination method, the aforementioned second regeneration method is used as the filter cleaning step.

Figure 3:
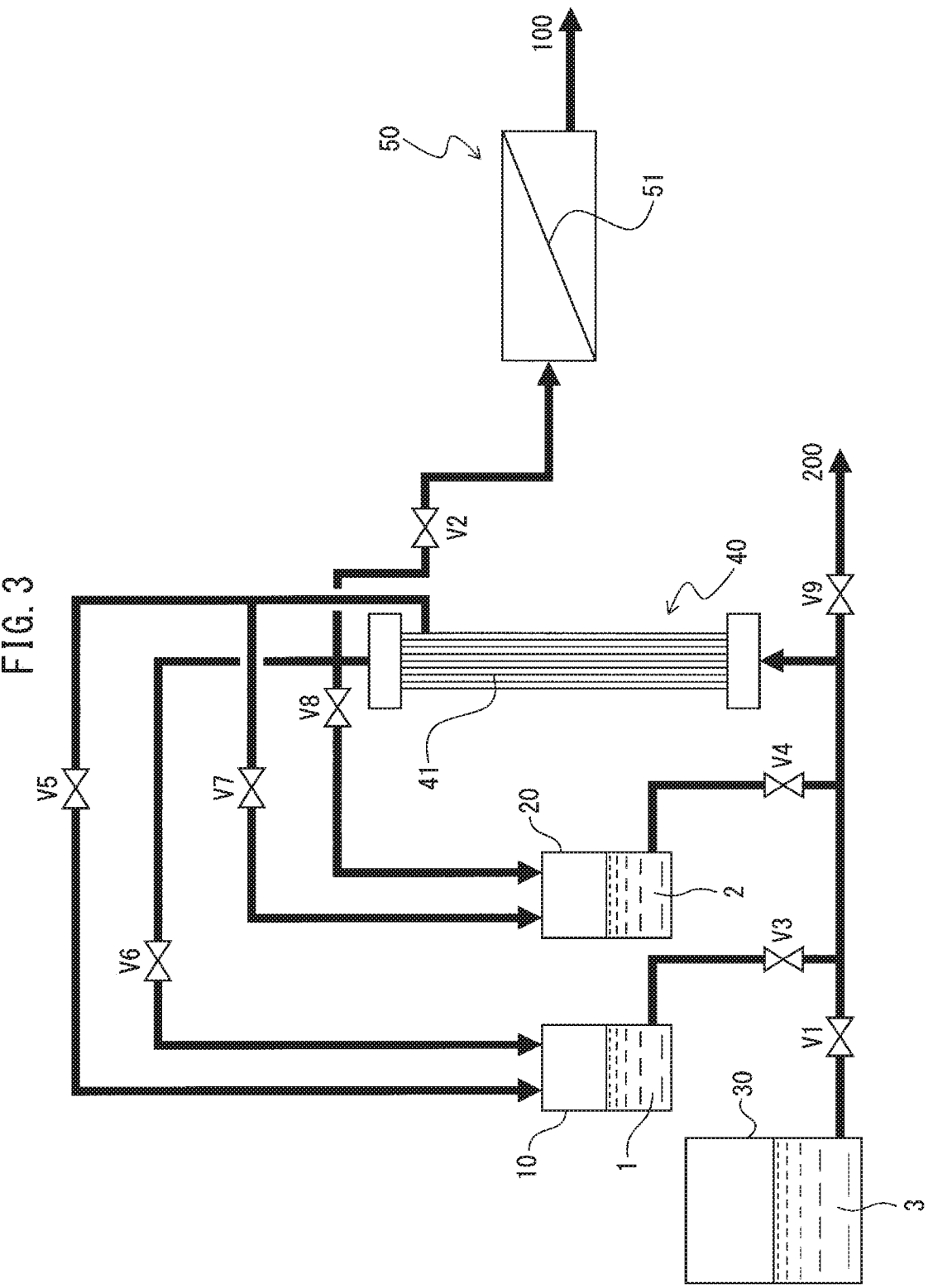
FIG. 3 is a schematic view showing another example of a process of the seawater desalination method of the present invention.

FIG. 3 is a schematic view showing an example of the process of the second seawater desalination method of the present invention.

The process of FIG. 3 includes, in addition to the seawater desalination process of FIG. 1, a structure including a first liquid chemical tank (10) and a second liquid chemical tank (20). Thus, like the filtration unit (40) of FIG. 1, the filtration unit (40) is an external pressure-type module including a water passage hole in the potting part. However, the present invention is not limited thereto.

In FIG. 3, plumbing for connecting the first liquid chemical tank (10) and the second liquid chemical tank (20) and valves for opening and closing the flow paths in the plumbing are included. Pumps for flowing solution and compressors for pressurizing the liquids are not shown.

Like the process of FIG. 2, in the process of FIG. 3, by opening the seawater desalination valves (V1, V2) and closing the other valves, seawater (3) stored in the seawater tank (30) flows sequentially to the filtration unit (40) and reverse osmosis unit (50) to obtain freshwater (100).

In the process of FIG. 3 as well, when the seawater desalination process has operated for a predetermined interval, deposits adhere to the filter used in the process, increasing the intermembrane differential pressure and decreasing the filtration flow rate.

When the intermembrane differential pressure reaches a predetermined value, the seawater desalination step is temporarily stopped, and the cleaning step for removing the deposits from the filter is carried out.

The cleaning step of the second seawater desalination method includes:

a first cleaning step for cleaning the filter with the first liquid chemical, and a second cleaning step for further cleaning the filter with the second liquid chemical after the first cleaning step.

In the first cleaning step, the seawater desalination valves (V1, V2) are closed to block the flow paths from the seawater tank (30) to the filtration unit (40) and from the filtration unit (40) to the reverse osmosis unit (50), the first liquid chemical discharge side valve (V3) is opened to open the flow path from the first liquid chemical tank (10) to the filtration unit (40), and the first liquid chemical (1) in the first liquid chemical tank (10) contacts the microfiltration membrane or ultrafiltration membrane (41) in the filtration unit (40). As a result, alkaline inorganic matter in the deposits of the microfiltration membrane or ultrafiltration membrane (41) can be gradually cleaned and removed.

In the process of FIG. 3 the first liquid chemical (10) is introduced from the lower inner pipe of the filtration unit (40). For example, the first liquid chemical (1) flows through the water passage hole in the potting part to the outside of the hollow fiber microfiltration membrane or ultrafiltration membrane (41).

When the first liquid chemical side pipe return valve (V5) is opened, the first liquid chemical (1) moves along the outside of the hollow fibers in the longitudinal direction of the hollow fibers and returns to the first liquid chemical tank (10) through the side pipe of the filtration unit (40), whereby a circulating surface cleaning flow path is formed. Conversely, when the first liquid chemical inner pipe return valve (V6) is opened, the first liquid chemical (1) passes from the outside of the hollow fibers through the outer wall of the hollow fibers in the membrane thickness direction to the inner hollow portion of the hollow fibers and returns to the first liquid chemical tank (10) through the upper inner pipe of the filtration unit (40), whereby a filtration cleaning circulating flow path is formed.

Both of these flow paths can be used by adjusting the degree of opening of the first liquid chemical side pipe return valve (V5) and the first liquid chemical inner pipe return valve (V6).

The cleaning in the first cleaning step may be circulation in which the first liquid chemical (1) moves along the aforementioned circulating flow paths or may be immersion cleaning in which the first liquid chemical (1) does not move. In the case of immersion cleaning, after the filtration unit (40) is filled with the first liquid chemical (1), each of the valves which are opened during immersion cleaning to form the circulating flow path may be kept open, or it may be closed.

In the case in which the first cleaning step is carried out by circulation, the full amount of the first liquid chemical (1) may be circulated with the drainage valve (V9) fully closed, or a method in which the drainage valve (V9) is opened halfway to circulate a portion of the first liquid chemical (1) and discard a portion of the first liquid chemical (1) may be used.

In the first cleaning process, while the second liquid chemical (2) is used, the second liquid chemical discharge side valve (V4), the second liquid chemical side pipe return valve (V7), and the second liquid chemical inner pipe return valve (V8) are closed.

After alkaline inorganic matter has been sufficiently removed, the first liquid chemical discharge side valve (V3), the second liquid chemical side pipe return valve (V7), and the second liquid chemical inner pipe return valve (V8) are closed, and when the drainage valve (V9) is open, the drainage valve (V9) is also closed, whereby the first cleaning step ends.

The degree of removal of alkaline inorganic matter can be known by, for example, the recovery of the transmembrane pressure difference reaching a steady-state value.

Next, after the microfiltration membrane or ultrafiltration membrane (41) has been rinsed as necessary, the second cleaning step is carried out.

In the second cleaning step, the second liquid chemical discharge side valve (V) and at least one of the second liquid chemical side pipe return valve (V7) and the second liquid chemical inner pipe return valve (V8) are opened so that the second liquid chemical (2) in the second liquid chemical tank (20) can contact the microfiltration membrane or ultrafiltration membrane (41) in the filtration unit (40). As a result, organic matter in the deposits on the microfiltration membrane or ultrafiltration membrane (41) can be gradually cleaned and removed. The second cleaning process can be carried out in the same manner as the first cleaning step. For example, either of circulation and immersion cleaning may be used, and either of filtration cleaning and surface cleaning may be used. Filtration cleaning and surface cleaning may be used simultaneously.

When circulation is used in the second cleaning step, the full amount of the second liquid chemical (2) may be circulated with the drainage valve (V9) fully closed, or a method in which the drainage valve (V9) is opened halfway to circulate a portion of the second liquid chemical (2) and discard a portion of the second liquid chemical (2) may be used.

In the second seawater desalination method, since alkaline inorganic matter in the deposits on the microfiltration membrane or ultrafiltration membrane (41) are sufficiently removed in the first cleaning step, even if the second cleaning step is continued, the pH of the second liquid chemical (2) does not rise, whereby cleaning efficiency does not decrease.

After the cleaning of the microfiltration membrane or ultrafiltration membrane (41) is stopped, the microfiltration membrane or ultrafiltration membrane (41) is rinsed as necessary, and the seawater desalination valves (V1, V2) are opened and the other valves are closed, seawater desalination may be continued.

After cleaning has been stopped for a predetermined interval, the cleaning effect may be confirmed by, for example, comparing with the initial value of the transmembrane pressure difference or the initial value of permeability performance.

The present invention has been described above using preferred embodiments as examples. However, the scope of the present invention is not limited to the above preferred embodiments but is defined by the scope of the attached claims.

EXAMPLES

The present invention will be described in more detail below by way of the Examples and Comparative Examples. However, the Examples and Comparative Examples do not limit the scope of the present invention.

In the Examples and Comparative Examples below, a seawater desalination device including a filtration unit and a reverse osmosis unit was used, seawater desalination was carried out for a predetermined interval, and the degree of recovery of permeability was investigated after cleaning the filtration unit having a permeability which was reduced by a predetermined method.

The seawater desalination and the cleaning of the filtration unit in the Examples and Comparative Examples was carried out at ambient temperature (20 to 25° C.).

In each Example and Comparative Example, an external pressure-type membrane module in which a plurality of hollow fiber filtration membranes (microfiltration membranes) made of polyvinylidene fluoride (PVDF) and having an average pore diameter of 0.08 μm manufactured by Asahi Kasei Corporation were bundled and packaged in an ABS casing having a length of 2 m and a diameter of 6 inches was used as the filtration unit. The membrane area of the membrane module was 50 $m^2$.

Seawater with 2.0 mg/L to 5.0 mg/L of total organic carbon (TOC) and a turbidity of 1 to 10 NTU (nephelometric turbidity units; the relative value measured as compared to a formazin standard solution) as measured with a TOC meter manufactured by Analytik Jena AG, 150 mg/L to 450 mg/mL of a biopolymer, 5 to 600 mg/L of calcium, and 0.5 to 1000 mg/L of magnesium was used as the raw water.

Using this seawater as the raw water, desalination was carried out by the filtration unit (membrane module) and reverse osmosis unit, and cleaning of the membrane module was carried out at the point at which the permeability decreased to 40% of the value prior to use (initial value) (at the point at which the transmembrane pressure increased to 200 kPa).

The degree of recovery of the permeability of the membrane module by cleaning was evaluated from the permeability recovery rate determined from the permeability before cleaning (F0) and the permeability after cleaning (F) by the following formula.

Permeability Recovery Rate (%)=$(F/F0) \times 100$

Example 1

In Example 1, seawater desalination and circulating filtration cleaning of the filtration unit were carried out using a device having the basic configuration shown in FIG. 2.

0.055 mol/L of hydrochloric acid (HCl aqueous solution) was used as the first liquid chemical and stored in a first liquid chemical tank.

An aqueous solution (initial pH value: 2.5) comprising 0.3 mol/L of hydrogen peroxide, 0.0005 mol/L of ferrous chloride, and 0.003 mol/L of tartaric acid was used as the second liquid chemical and stored in a second liquid chemical tank.

After seawater desalination was carried out and the permeability of the membrane module was reduced to 40% of the initial value, seawater desalination was stopped and cleaning of the membrane module was carried out.

While continuously adding first liquid chemical to the second liquid chemical tank to adjust the pH of the second liquid chemical to the range of 2.0 to 3.0, circulating filtration cleaning was carried out for 6 hours at a supply side flow amount of 0.5 $m^3$/hr and a discharge side flow amount of 0.5 m/hr. At this time, the liquid chemicals were supplied to the outside of the hollow fiber membrane of the membrane module and passed through the outer wall of the hollow fibers so as to be discharged from the inside. Thereafter, the liquid chemicals were removed from the inside of the membrane module, and 300 liters of tap water was flowed through the membrane module for 30 minutes to carry out rinsing.

As a result of the cleaning by the above cleaning method, the permeability recovery rate was 92%.

Comparative Example 1

In Comparative Example 1, circulating filtration cleaning was carried out for 6 hours on a membrane module having a permeability reduced to 40% the initial value in the same manner as Example 1 except that a first liquid chemical was not used and the pH of the second liquid chemical during cleaning was not adjusted. The pH of the second liquid chemical in the cleaning increased rapidly from the initial value of 2.5 to 3.7 one minute after cleaning started, to 7.5 after 5 minutes, and became substantially constant at around 7.2.

As a result of cleaning with the above cleaning method, the permeability recovery rate was 54%.

Figure 4:
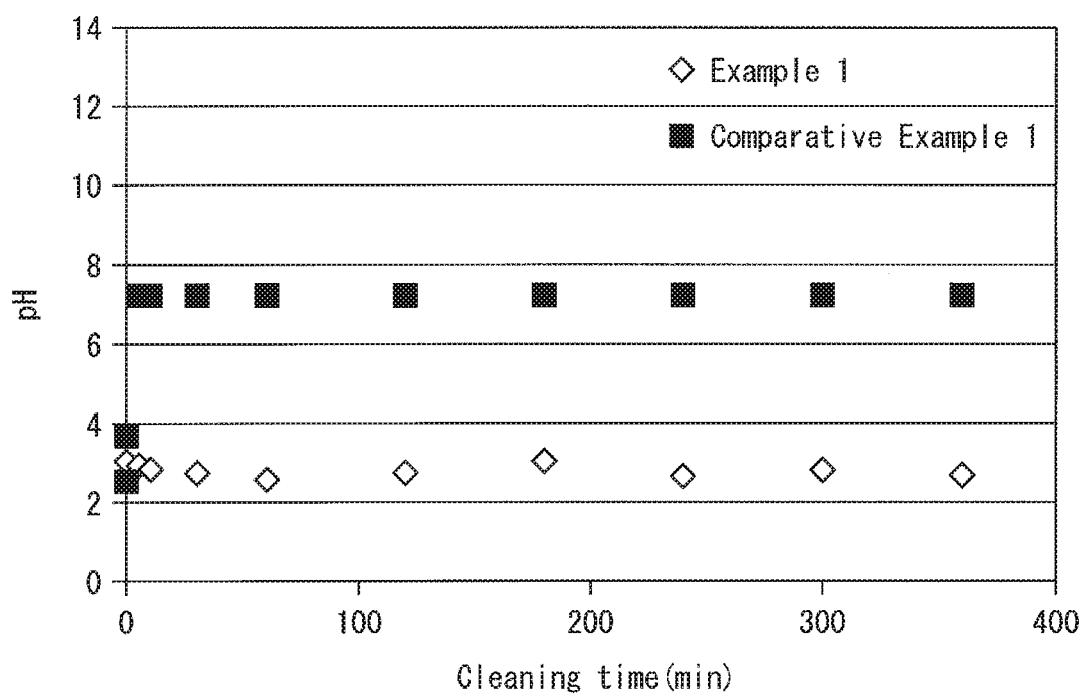
FIG. 4 is a graph showing the change in pH of a second liquid chemical over time as measured in Example 1 and Comparative Example 1.

FIG. 4 is a graph of the change of the pH of the second liquid chemical over time as measured in the cleaning of Example 1 and Comparative Example 1.

It is inferred that the reason why the permeability recovery rate of the cleaning of Comparative Example 1 was low was attributable to the fact that decomposition of contaminants attached to the surface of the hollow fiber membranes in the membrane module was insufficient since adjustment of the pH of the second liquid chemical was not carried out during cleaning.

Example 2

In Example 2, in the device shown in FIG. 2, seawater desalination and immersion cleaning of the filtration unit were carried out, using a device connected to the second liquid chemical supply plumbing from the discharge side line from the first liquid chemical tank 10.

0.3 mol/L of hydrochloric acid (HCl aqueous solution) was used as the first liquid chemical and stored in the first liquid chemical tank.

An aqueous solution (initial pH value: 2.5) comprising 0.3 mol/L of hydrogen peroxide, 0.0005 mol/L of ferrous chloride, and 0.003 mol/L of tartaric acid was used as the second liquid chemical and stored in the second liquid chemical tank.

The second liquid chemical was filled into the membrane module and cleaning was carried out on the membrane module having a permeability reduced to 40% of the initial value. Immersion cleaning was carried out for 6 hours. During cleaning, the liquid chemical was sampled at an appropriate time from the immediate vicinity of the membrane module (at the position corresponding to the arrow labelled "pH" in FIG. 2) of the second liquid chemical supply plumbing to confirm the pH of the second liquid chemical, and the first liquid chemical was added to the second liquid chemical as necessary to adjust the pH of the second liquid chemical to the range of 2.0 to 3.0.

Thereafter, the liquid chemical was removed from the inside of the membrane module, and 300 liters of tap water was flowed through the membrane module for 30 minutes to carry out rinsing.

As a result of the cleaning by the above cleaning method, the permeability recovery rate was 90%.

Example 3

In Example 3, seawater desalination and circulating filtration cleaning of the filtration unit were carried out using the device having the basic configuration shown in FIG. 3.

0.3 mol/L of hydrochloric acid (HCl aqueous solution) was used as the first liquid chemical and stored in the first liquid chemical tank.

An aqueous solution (pH initial value: 2.5) comprising 0.3 mol/L of hydrogen peroxide, 0.0005 mol/L of ferrous chloride, and 0.003 mol/L of tartaric acid was used as the second liquid chemical and stored in the second liquid chemical tank.

After seawater desalination was carried out and the permeability of the membrane module decreased to 40% of the initial value, seawater desalination was stopped and cleaning of the membrane module was carried out.

First, circulating filtration cleaning using the first liquid chemical was carried out for 1 hour as the first cleaning step. Thereafter, the first liquid chemical was removed from the membrane module, rinsing by water was not carried out, and subsequently, circulating filtration cleaning using the second liquid chemical was carried out for 6 hours as the second cleaning step. The circulating filtration cleaning was carried out at a supply side flow amount of 0.5 m$^3$/hr and a discharge side flow amount of 0.5 m$^3$/hr.

Thereafter, the second liquid chemical was removed from the membrane module and 300 liters of tap water was flowed through the membrane module for 30 minutes to carry out rinsing.

As a result of the cleaning by the above cleaning method, the permeability recovery rate was 89%.

Example 4

In Example 4, seawater desalination and immersion cleaning of the filtration unit was carried out using the device having the basic configuration shown in FIG. 3.

0.3 mol/L of hydrochloric acid (HCl aqueous solution) was used as the first liquid chemical and stored in the first liquid chemical tank.

An aqueous solution (initial pH value: 2.5) comprising 0.3 mol/L of hydrogen peroxide, 0.0005 mol/L of ferrous chloride, and 0.003 mol/L of tartaric acid was used as the second liquid chemical and stored in the second liquid chemical tank.

After seawater desalination was carried out and the permeability of the membrane module decreased to 40% of the initial value, seawater desalination was stopped and cleaning of the membrane module was carried out.

First, the membrane module was filled with the first liquid chemical and immersion cleaning was carried out for 1 hour as the first cleaning step. Thereafter, the first liquid chemical was removed from the membrane module, rinsing by water was not carried out, the membrane module was filled with the second liquid chemical and immersion cleaning was carried out for 6 hours as the second cleaning step.

Thereafter, the second liquid chemical was removed from the membrane module and 300 liters of tap water was flowed through the membrane module for 30 minutes to carry out rinsing.

As a result of the cleaning by the above cleaning method, the permeability recovery rate was 88%.

Comparative Example 21

In Comparative Example 2, immersion cleaning of a membrane module having a permeability reduced to 40% of the initial value was carried out for 6 hours as the second cleaning step in the same manner as Example 4 except that the first cleaning step was not carried out. Thereafter, rinsing was carried out.

As a result of the cleaning by the above cleaning method, the permeability recovery rate was 51%.

Comparative Examples 3 to 6

Comparative Examples 3 to 6 relate to Comparative Examples of the prior art. The seawater desalination and cleaning of the filtration unit in these Comparative examples were carried out using a device having the basic configuration shown in FIG. 3 and replacing the contents of the liquid chemical tanks with the liquid chemicals of the prior art.

Comparative Example 3

An aqueous solution comprising 0.03 mol/L of sodium chlorite and 0.25 mol/L of sodium hydroxide was used as a first cleaning solution and stored in the first liquid chemical tank.

An aqueous solution comprising 0.05 mol/L of citric acid and 0.3 mol/L of HC was used as the second cleaning solution and stored in the second liquid chemical tank.

After seawater desalination was carried out and the permeability of the membrane module decreased to 40% of the initial value, seawater desalination was stopped and cleaning of the membrane module was carried out.

First, circulating filtration cleaning using the first cleaning solution was carried out for 6 hours as the first cleaning step. Thereafter, the first cleaning solution was removed from the membrane module, and 300 liters of tap water was flowed through the membrane module for 30 minutes to carry out rinsing.

Next, circulating filtration cleaning was carried out using the second cleaning liquid chemical for 2 hours as the second cleaning step. Thereafter, the second cleaning solution was removed from the membrane module and 300 liters of tap water was flowed through the membrane module for 30 minutes to carry out rinsing.

The above circulating filtration cleaning in the first cleaning step and the second cleaning step was carried out at a supply side flow amount of 0.5 m$^3$ hr and a discharge side flow amount of 0.5 m$^3$/hr.

As a result of the cleaning by the above cleaning method, the permeability recovery rate was 68%.

Comparative Example 41

In Comparative Example 4, cleaning of a membrane module having a permeability reduced to 40% of the initial value was carried out in the same manner as Comparative Example 3 except that immersion cleaning for 6 hours was used as the first cleaning step and immersion cleaning for 2 hours was used as the second cleaning step.

As a result of the cleaning by the above cleaning method, the permeability recovery rate was 68%.

Comparative Example 51

In Comparative Example 5, cleaning of a membrane module having a permeability reduced to 40% of the initial value was carried out in the same manner as Comparative Example 3 except that circulating filtration cleaning with the second cleaning solution for 2 hours was used as the first cleaning step and circulating filtration cleaning with the first cleaning solution for 6 hours was used as the second cleaning step.

As a result of the cleaning by the above cleaning method, the permeability recovery rate was 59%.

Comparative Example 61

In Comparative Example 6, cleaning of a membrane module having a permeability reduced to 40% of the initial value was carried out in the same manner as Comparative Example 3 except that immersion cleaning with the second cleaning solution for 2 hours was used as the first cleaning step and immersion cleaning with the first cleaning solution for 6 hours was used as the second cleaning step.

As a result of the cleaning by the above cleaning method, the permeability recovery rate was 56%.

REFERENCE SIGNS LIST 1 first liquid chemical
2 second liquid chemical
3 seawater
10 first liquid chemical tank
20 second liquid chemical tank
21 pH meter
30 seawater tank
40 filtration unit
41 microfiltration membrane or ultrafiltration membrane
50 reverse osmosis unit
51 reverse osmosis membrane
100 freshwater
200 drainage
V1, V2 seawater desalination valve
V3 first liquid chemical discharge side valve
V4 second liquid chemical discharge side valve
V5 first liquid chemical side pipe return valve
V6 first liquid chemical inner pipe return valve
V7 second liquid chemical side pipe return valve
V8 second liquid chemical inner pipe return valve
V9 drain valve
pH pH measurement sampling position

The invention claimed is:

1. A method for regenerating a member used in a device for treating seawater, the method comprising:
a cleaning process for removing a deposit from the member, wherein
in the cleaning process:
the deposit is removed from the member by cleaning the member with:
a first liquid chemical comprising an acid other than a hydroxy dicarboxylic acid,
a second liquid chemical comprising hydrogen peroxide, a heavy metal compound, and a hydroxy dicarboxylic acid,
the second liquid chemical contacted with the deposit becomes an alkaline used second liquid chemical,
the first liquid chemical is added to the used second liquid chemical to form an acidic regenerated second liquid chemical, and
the regenerated second liquid chemical is used as the second liquid chemical in the cleaning process.

2. The method for regenerating a member according to claim 1, wherein the device for treating seawater is a seawater desalination device for filtering seawater and subsequently desalinating the seawater with a reverse osmosis treatment.

3. The method for regenerating a member according to claim 1, wherein the member is a filter.

4. The method for regenerating a member according to claim 1, wherein the device for treating seawater is a seawater desalination device for filtering seawater and subsequently desalinating the seawater with a reverse osmosis treatment,
the member is a filter, and
the filter is one or more selected from the group consisting of a microfiltration membrane and ultrafiltration membrane used in the filtration of seawater, and a reverse osmosis membrane used in the reverse osmosis treatment of the filtered seawater.

5. The method for regenerating a member according to claim 1, wherein the acid other than a hydroxy dicarboxylic acid in the first liquid chemical is one or more selected from hydrochloric acid, nitric acid, sulfuric acid, citric acid, oxalic acid, ascorbic acid, and ethylenediaminetetraacetic acid.

6. The method for regenerating a member according to claim 3, wherein the deposit removed from the filter by the cleaning process comprises:
inorganic matter which is a compound including one or more metal ions selected from calcium, magnesium, sodium, potassium, and strontium, and
organic matter.

7. The method for regenerating a member according to claim 6, wherein the deposit comprises a calcium salt.

8. The method for regenerating a member according to claim 3, wherein
the cleaning process comprises:
a pH adjusting for adding the first liquid chemical to the second liquid chemical to adjust the pH of the second liquid chemical to 6.0 or less, and
a deposit removal that removes the deposit from the filter with the second liquid chemical having a pH adjusted to 6.0 or less.

9. The method for regeneration of a member according to claim 8, wherein the deposit removed from the filter by the cleaning process comprises:
inorganic matter which is a compound including one or more metal ions selected from calcium, magnesium, sodium, potassium, and strontium, and
organic matter.

10. The method for regenerating a member according to claim 9, wherein the deposit comprises a calcium salt.

11. The method for regenerating a member according to claim 3, wherein the cleaning process comprises:
a first cleaning process for cleaning the filter with the first liquid chemical, and a second cleaning process for further cleaning a filter after the first cleaning process with the second liquid chemical.

12. The method for regenerating a member according to claim 11, wherein the deposit removed from the filter in the first cleaning process comprises inorganic matter which is a compound including one or more metal ions selected from calcium, magnesium, sodium, potassium, and strontium.

13. The method for regenerating a member according to claim 12, wherein the deposit comprises a calcium salt.

14. The method for regenerating a member according to claim 11, wherein the deposit removed from the filter in the second cleaning process comprises organic matter.

15. The method for regenerating a member according to claim 1, wherein the member is a member comprising a conduit.

16. The method for regenerating a member according to claim 15, wherein the member is plumbing, a strainer, a valve, or a pump.

\* \* \* \* \*